US010749972B2

(12) United States Patent
Morillon et al.

(10) Patent No.: US 10,749,972 B2
(45) Date of Patent: Aug. 18, 2020

(54) METHOD FOR LOCATING A SERVICE AND METHOD FOR PROPOSING A SERVICE AND CORRESPONDING COMMUNICATION NETWORK DEVICES, SYSTEM, COMPUTER READABLE PROGRAM PRODUCTS AND COMPUTER READABLE STORAGE MEDIUMS

(71) Applicant: THOMSON LICENSING, Issy les Moulineaux (FR)

(72) Inventors: Gilles Morillon, Rennes (FR); Stephane Le Glatin, Goven (FR); Goulven Querre, Noyal sur Vilaine (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 291 days.

(21) Appl. No.: 15/196,497

(22) Filed: Jun. 29, 2016

(65) Prior Publication Data

US 2016/0381152 A1 Dec. 29, 2016

(30) Foreign Application Priority Data

Jun. 29, 2015 (EP) .................................. 15306034

(51) Int. Cl.
*G06F 15/173* (2006.01)
*H04L 29/08* (2006.01)
(Continued)

(52) U.S. Cl.
CPC ................ *H04L 67/16* (2013.01); *G06F 8/61* (2013.01); *H04W 4/50* (2018.02); *H04W 4/60* (2018.02); *H04L 67/04* (2013.01); *H04L 67/34* (2013.01)

(58) Field of Classification Search
CPC ......... H04L 67/16; H04L 67/34; H04L 67/04; H04W 4/60; H04W 4/50; G06F 8/61
See application file for complete search history.

(56) References Cited

U.S. PATENT DOCUMENTS 6,067,580 A 5/2000 Aman et al.
7,631,084 B2 12/2009 Thomas et al.
(Continued)

FOREIGN PATENT DOCUMENTS

CN 1781087 5/2006
CN 101951400 1/2011
(Continued)

*Primary Examiner* — John B Walsh
(74) *Attorney, Agent, or Firm* — Tutunjian & Bitetto, P.C.

(57) ABSTRACT

The present disclosure relates to a method for locating a service, to be performed in a device belonging to a network of communication devices. According to an embodiment, the method includes checking an availability of the service on the network, when the service is not available on the network, obtaining an installation requirement representative of a capacity required from a candidate device for an installation of the service on the candidate device, sending the obtained installation requirement on the network, receiving an indication of a compliance, of a candidate device of the network, to the installation requirement, sending an order of installation of the service to the candidate device according to the indication of compliance. The present disclosure relates to corresponding proposing method, devices, system, computer readable program products and computer readable storage mediums.

20 Claims, 5 Drawing Sheets

(51) Int. Cl.
*H04W 4/60* (2018.01)
*H04W 4/50* (2018.01)
*G06F 8/61* (2018.01)

(56) References Cited

U.S. PATENT DOCUMENTS

| | | |
|---|---|---|
| 8,140,666 B2 | 3/2012 | Dias et al. |
| 8,868,692 B1 * | 10/2014 | Khanna ............... H04L 41/0866 |
| | | 709/219 |
| 2002/0032768 A1 | 3/2002 | Voskuil |
| 2002/0143819 A1 * | 10/2002 | Han .................... G06F 17/3089 |
| | | 715/237 |
| 2011/0050449 A1 | 3/2011 | Park et al. |
| 2014/0115025 A1 | 4/2014 | Taoka et al. |

FOREIGN PATENT DOCUMENTS

| | | |
|---|---|---|
| CN | 102484895 | 5/2012 |
| WO | WO2014178185 | 11/2014 |

* cited by examiner

METHOD FOR LOCATING A SERVICE AND METHOD FOR PROPOSING A SERVICE AND CORRESPONDING COMMUNICATION NETWORK DEVICES, SYSTEM, COMPUTER READABLE PROGRAM PRODUCTS AND COMPUTER READABLE STORAGE MEDIUMS

This application claims the benefit, under 35 U.S.C. § 119 of European Patent Application No. 15306034.8, filed Jun. 29, 2015.

1. TECHNICAL FIELD

The present disclosure relates to the field of communication network devices, and notably to communication network devices adapted to be used in a private network.

A method for locating a service and a method for proposing a service, and corresponding communication network devices, system, computer readable program product and computer readable storage medium are described.

2. BACKGROUND ART

Network communication end-devices, for instance smartphones, tablets, personal computers, connected watches, or peripherals like printers, have become widely used nowadays. They can exchange data with other communication devices inside a network, for instance a wireless local area network (WLAN) or a Wide Area Network (WAN).

The number of electronic devices comprised in a home environment is increasing significantly. Furthermore, communication end-devices offer more and more features to a user. These features often require complex calculation or large collection of data. As a consequence, the software applications used for monitoring these devices are becoming more complex and are built upon numerous software services (like text to speech or speech to text services, facial recognition, instantaneous translation, and others). These software services are themselves often very intensive in terms of CPU use, memory, reaction time, and can require particular operating conditions to be filled. For instance a particular operating system can sometimes be needed in order to execute a service.

However, not all communication devices in a home environment are very powerful. The home environment often comprises small and cheap devices. Thus, all the needed resources may not be always available on a single device (notably when the device is a simple and cheap device).

A solution to these drawbacks, for running a software application in a non-powerful device, is the use of web services, located on a distant server and called by the software application, instead of using locally located services. However, this solution introduces new drawbacks. Notably, the user has often no control over the server. In particular, the access to the service offered by the distant server may involve the communication of sensitive data to the distant server (like bank account, identification or authentication data, and so on). The user has no guarantee about the way those sensitive data will be exploited, especially by those that should not have access to this data in the first instance.

One other drawback of such a solution is that when the server is accessed by many software applications, its response time may be very long.

So, there's a need to provide a solution that improves, compared to prior art solutions, the experience of a user of a communication device when a software application is executed on the communication device in a home environment.

3. SUMMARY OF THE PRESENT DISCLOSURE

The present principles enable at least one of the above disadvantages to be resolved by proposing a method for locating a service, to be performed in a communication network device belonging to at least one first network of communication devices.

This service can be for instance a service rendered by an application or an Operating System (that can be executed in batch mode for instance).

According to an embodiment of the present disclosure, said method comprises:
  checking an availability of the service on said first network;
  when the service is not available on said first network, obtaining at least one installation requirement representative of at least one capacity required from a candidate device for an installation of the service on said candidate device;
  sending (or publishing) the obtained installation requirement on said first network;
  receiving an indication of a compliance, of at least one candidate device of said first network, to said installation requirement;
  sending an order of installation of the service to at least one of said candidate devices according to said indication of compliance.

According to an embodiment of the present disclosure, said method further comprises, when the service is available on another device of said first network, invoking the service on said another device.

According to an embodiment of the present disclosure, said checking comprises:
  sending at least one descriptor of the service;
  waiting for an indication of an availability of the service on said first network.

According to an embodiment of the present disclosure, said obtaining comprises:
  sending a descriptor of said non available service to a provider of said service;
  receiving said installation requirement.

According to an embodiment of the present disclosure, said service provider and said communication device belong to a second communication network.

According to an embodiment of the present disclosure, said first network is a local area network and/or a home network.

According to an embodiment of the present disclosure, said service is to be invoked by a software application executing on said communication device.

According to another aspect, the present disclosure relates to a communication network device belonging to at least one first network of communication devices.

According to an embodiment of the present disclosure, said communication network device comprises at least one processor configured for:
  checking an availability of a service on said first network;
  when the service is not available on said first network, obtaining at least one installation requirement representative of at least one capacity required from a candidate device for an installation of the service on said candidate device;

publishing the obtained installation requirement on said first network;

receiving an indication of a compliance, of at least one candidate device of said first network, to said installation requirement;

sending an order of installation of the service to at least one of said candidate devices according to said indication of compliance.

According to an embodiment of the present disclosure, said processor is configured for invoking the service on another device of said first network when the service is available on said another device.

According to an embodiment of the present disclosure, said obtaining comprises:

sending a descriptor of said non available service to a provider of said service;

receiving said installation requirement.

According to an embodiment of the present disclosure, said service provider and said communication device belong to a second communication network.

According to an embodiment of the present disclosure, said first network is a local area network and/or a home network According to an embodiment of the present disclosure, said service is to be invoked by a software application executing on said communication device. While not explicitly described, the communication network device of the present disclosure can be adapted to perform the locating method of the present disclosure in any of its embodiments.

According to another aspect, the present disclosure relates to a method for proposing a service, to be performed in a communication network device belonging at least to a first network of communication devices.

According to an embodiment of the present disclosure, said method comprises:

receiving a request for an availability of a service;

when said service is available on said communication device, sending an indication of said availability to the sender of said request;

when said service is not available on said communication device, receiving at least one installing requirement representative of at least one capacity required from a candidate device for the installation of said service on said candidate device;

when said communication device hold said at least one required capacity, transmitting an indication of compliance of said communication device to a sender of said received installation requirement.

According to an embodiment of the present disclosure, the proposing method further comprises allocating said required capacity to said service.

According to an embodiment of the present disclosure, the proposing method further comprises, when receiving a request of installation of said service, installing said service on said communication device.

According to an embodiment of the present disclosure, said installing comprises loading said service from a second network.

According to an embodiment of the present disclosure, the proposing method further comprises, when receiving a cancellation message, liberating said allocated capacities.

According to another aspect, the present disclosure relates to a communication network device belonging to at least one first network of communication devices.

According to an embodiment of the present disclosure, said communication device comprises at least one processor configured for:

receiving a request for an availability of a service, said request comprising at least one descriptor of said service;

when said service is available on said communication device, sending an indication of said availability to the sender of said request;

when said service is not available on said communication device, receiving at least one installing requirement representative of at least one capacity required from a candidate device for the installation of said service on said candidate device;

when said communication device hold said at least one required capacity, transmitting an indication of compliance of said communication device to a sender of said received installation requirement.

While not explicitly described, the communication network device of the present disclosure can be adapted to perform the proposing method of the present disclosure in any of its embodiments. Notably, according to an embodiment of the present disclosure, said processor is configured for installing said service on said communication device, when receiving a request of installation of said service.

According to an embodiment of the present disclosure, said installing comprises loading said service from a second network.

According to another aspect, the present disclosure relates to a communication system comprising at least a first and a second communication network device, belonging to at least one first network of communication devices.

According to an embodiment of the present disclosure, said first communication network device comprises at least one first processor configured for checking an availability of a service on said first network;

when the service is not available on said first network, obtaining at least one installation requirement representative of at least one capacity required from a candidate device for the installation of the service on said candidate device;

publishing the obtained installation requirement on said first network;

receiving an indication of a compliance, of at least one candidate device of said first network, to said installation requirement;

sending an order of installation of the service to at least one of said candidate devices according to said indication of compliance;

and said second communication device comprises at least one second processor configured for:

receiving a request for an availability of a service, said request comprising at least one descriptor of said service;

when said service is available on said second communication device, sending an indication of said availability to the sender of said request;

when said service is not available on said second communication device, receiving at least one installing requirement representative of at least one capacity required from a candidate device for the installation of said service on said candidate device;

when said second communication device hold said at least one required capacity, transmitting an indication of compliance of said second communication device to a sender of said received installation requirement.

While not explicitly described, the present embodiments related to the present methods or to the corresponding communication network devices or system can be employed in any combination or sub-combination. For example, some embodiments can involve a device adapted to perform concurrently the location method and the proposing method of the present disclosure.

According to another aspect, the present disclosure relates to a non-transitory program storage device, readable by a computer.

According to an embodiment of the present disclosure, said non-transitory computer readable program product tangibly embodies a program of instructions executable by a computer to perform the locating method described above, in any of its embodiments.

According to an embodiment of the present disclosure, said non-transitory computer readable program product tangibly embodies a program of instructions executable by a computer to perform a method for locating a service, to be performed in a communication network device belonging to at least one first network of communication devices, said method comprising:

checking an availability of the service on said first network;
when the service is not available on said first network, obtaining at least one installation requirement representative of at least one capacity required from a candidate device for an installation of the service on said candidate device;
sending (or publishing) the obtained installation requirement on said first network;
receiving an indication of a compliance, of at least one candidate device of said first network, to said installation requirement;
sending an order of installation of the service to at least one of said candidate devices according to said indication of compliance.

According to an embodiment of the present disclosure, said non-transitory computer readable program product tangibly embodies a program of instructions executable by a computer to perform the proposing method described above, in any of its embodiments.

According to an embodiment of the present disclosure, said non-transitory computer readable program product tangibly embodies a program of instructions executable by a computer to perform a method for proposing a service, to be performed in a communication network device belonging at least to a first network of communication devices, said method comprising:

receiving a request for an availability of a service;
when said service is available on said communication device, sending an indication of said availability to the sender of said request;
when said service is not available on said communication device, receiving at least one installing requirement representative of at least one capacity required from a candidate device for the installation of said service on said candidate device;
when said communication device hold said at least one required capacity, transmitting an indication of compliance of said communication device to a sender of said received installation requirement.

According to another aspect, the present disclosure relates to a computer readable storage medium carrying a software program comprising program code instructions for performing the locating method of the present disclosure, in any of its embodiments, when said non transitory software program is executed by a computer.

According to another aspect, the present disclosure relates to a computer readable storage medium carrying a software program comprising program code instructions for performing a method for locating a service, to be performed in a communication network device belonging to at least one first network of communication devices, said method comprising:

checking an availability of the service on said first network;
when the service is not available on said first network, obtaining at least one installation requirement representative of at least one capacity required from a candidate device for an installation of the service on said candidate device;
sending (or publishing) the obtained installation requirement on said first network;
receiving an indication of a compliance, of at least one candidate device of said first network, to said installation requirement;
sending an order of installation of the service to at least one of said candidate devices according to said indication of compliance.

According to another aspect, the present disclosure relates to a computer readable storage medium carrying a software program comprising program code instructions for performing the proposing method of the present disclosure, in any of its embodiments, when said non transitory software program is executed by a computer.

According to another aspect, the present disclosure relates to a computer readable storage medium carrying a software program comprising program code instructions for performing a method for proposing a service, to be performed in a communication network device belonging at least to a first network of communication devices, said method comprising:

receiving a request for an availability of a service;
when said service is available on said communication device, sending an indication of said availability to the sender of said request;
when said service is not available on said communication device, receiving at least one installing requirement representative of at least one capacity required from a candidate device for the installation of said service on said candidate device;
when said communication device hold said at least one required capacity, transmitting an indication of compliance of said communication device to a sender of said received installation requirement.

As will be appreciated by one skilled in the art, aspects of the present disclosure can be embodied as a system, device, method, or computer readable medium. Accordingly, aspects of the present disclosure can take the form of a hardware embodiment, a software embodiment (including firmware, resident software, micro-code, and so forth), or an embodiment combining software and hardware aspects that can all generally be referred to herein as a "circuit", module" or "system". Furthermore, aspects of the present disclosure can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing.

It is to be appreciated that the following, while providing more specific examples of computer readable storage mediums to which the present disclosure can be applied, is merely an illustrative and not exhaustive listing as is readily appreciated by one of ordinary skill in the art: a portable computer diskette, a hard disk, a read-only memory (ROM), an erasable programmable read-only memory (EPROM or Flash memory), a portable compact disc read-only memory (CD-ROM), an optical storage device, a magnetic storage device, or any suitable combination of the foregoing.

Thus, for example, it will be appreciated by those skilled in the art that the block diagrams presented herein represent conceptual views of illustrative system components and/or circuitry of some embodiments of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

4. LIST OF DRAWINGS

The present disclosure will be better understood, and other specific features and advantages will emerge upon reading the following description, the description making reference to the annexed drawings wherein.

It is to be noted that the drawings are for illustrative purposes only and that the embodiments of the present disclosure are not limited to the illustrated embodiments.

5. DETAILED DESCRIPTION OF THE EMBODIMENTS

The disclosure relates to the sharing of a software service (or function, or module) by processors located in several devices connected via a local network.

At least one embodiment of the present disclosure offers a new way of locating a remote service, in view of its invocation, notably permitting to protect sensitive data. Indeed, such data should not to be sent, without special security constraints, outside a private network. More precisely, at least one embodiment relates to a method, to be performed in an electronic device connected to a local network, of location of a service that permits to avoid unnecessary access to a distant server and, if a service is not available in the local network, monitor the installation of the service in the local network. Thus, in some embodiments, only one access to a remote server will be performed for all the devices present in the home network.

Figure 1:
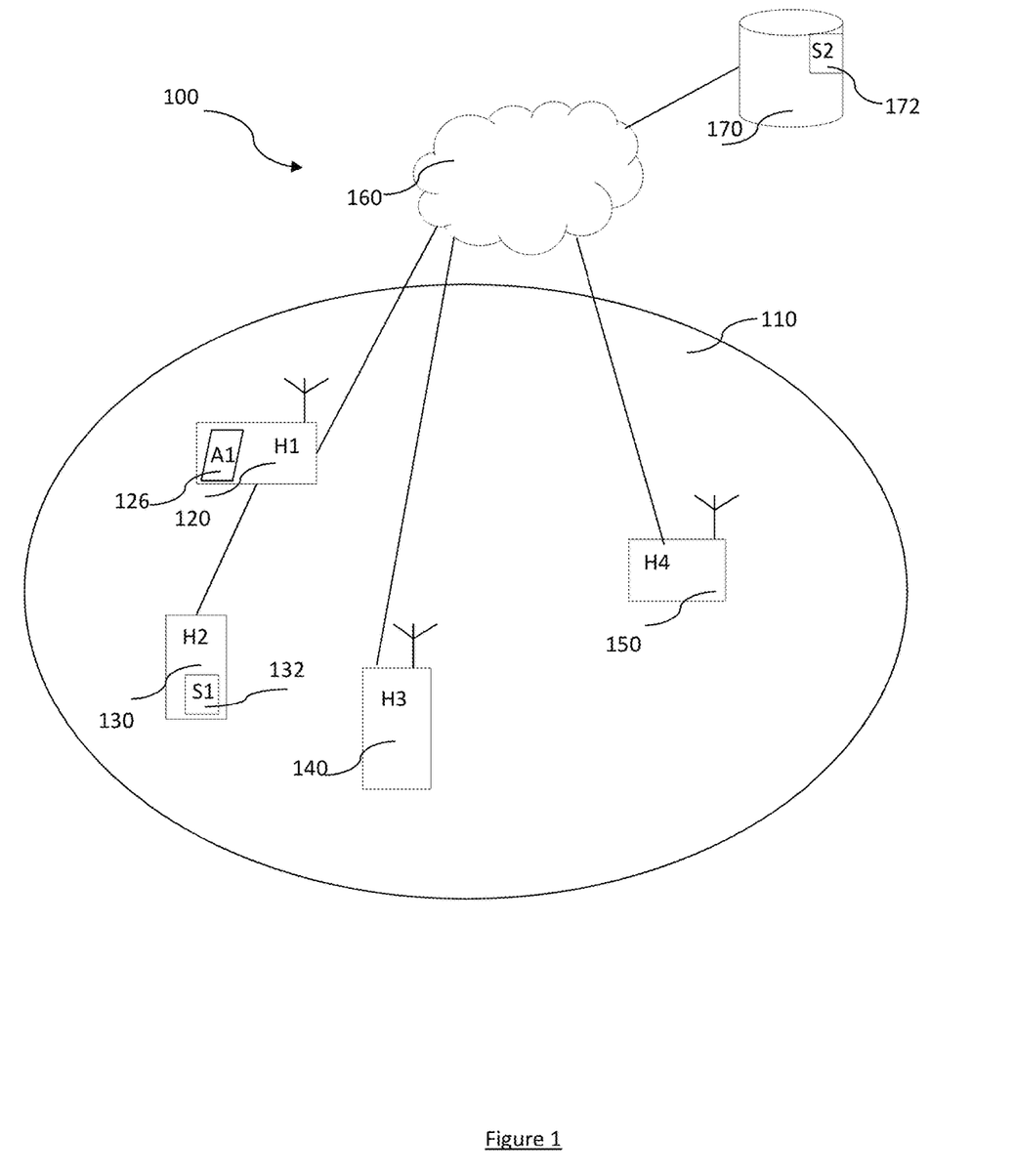
FIG. 1 shows an example of a communication system according to a particular embodiment of the present disclosure.

In the detailed embodiment illustrated in FIG. 1, a communication system 100 is described.

The system comprises a private Network 110, for instance a home network. In the illustrated embodiment, the home network is a WLAN network.

The WLAN network comprises a communication device (H1) 120 (for instance a gateway, a Wi-Fi repeater, or a Wi-Fi router, a smartphone, a personal computer, a smart fridge, . . . ) and wireless devices (H3) 140, (H4) 150 (for instance web cam, printers, music players, loud speakers, or mobile devices such as, but not limited to, smart phones, tablets, etc.), located in a coverage area of the communication device 120 (either directly or via a repeater, for instance a WIFI repeater). It can also comprise wired client devices (H2) 130, connected for instance via a wired interface, for instance an Ethernet interface, to the network communication device 120.

In the particular embodiment detailed, the device 120 communicates via a WAN network 160, for instance a network of Internet type, to a remote server 170 acting as a service provider. According to FIG. 1, some other communication devices 130, 140, 150 of the WLAN network 110 can also access the WAN network 160.

The communication device 120 comprises an application (A1) 126 which needs potentially to invoke a service (S1) 132, (S2) 172 during its execution. This invocation is performed by means of a software module (or component or object), like a "service proxy", which encapsulates, from a software developer's point of view, the access to the service (by providing a high level interface to the service and hiding the physical invocation of the service notably). When coding the application, the developer just needs to know the interface of the service. He does not need to care about the way the service is implemented, and notably where the service is located.

In the particular embodiment described, the locating method is performed inside the software module, which is part of the application. Such an embodiment can permit to offer a transparency of the location of a service outside the software module, for instance at an application level.

Figure 2:
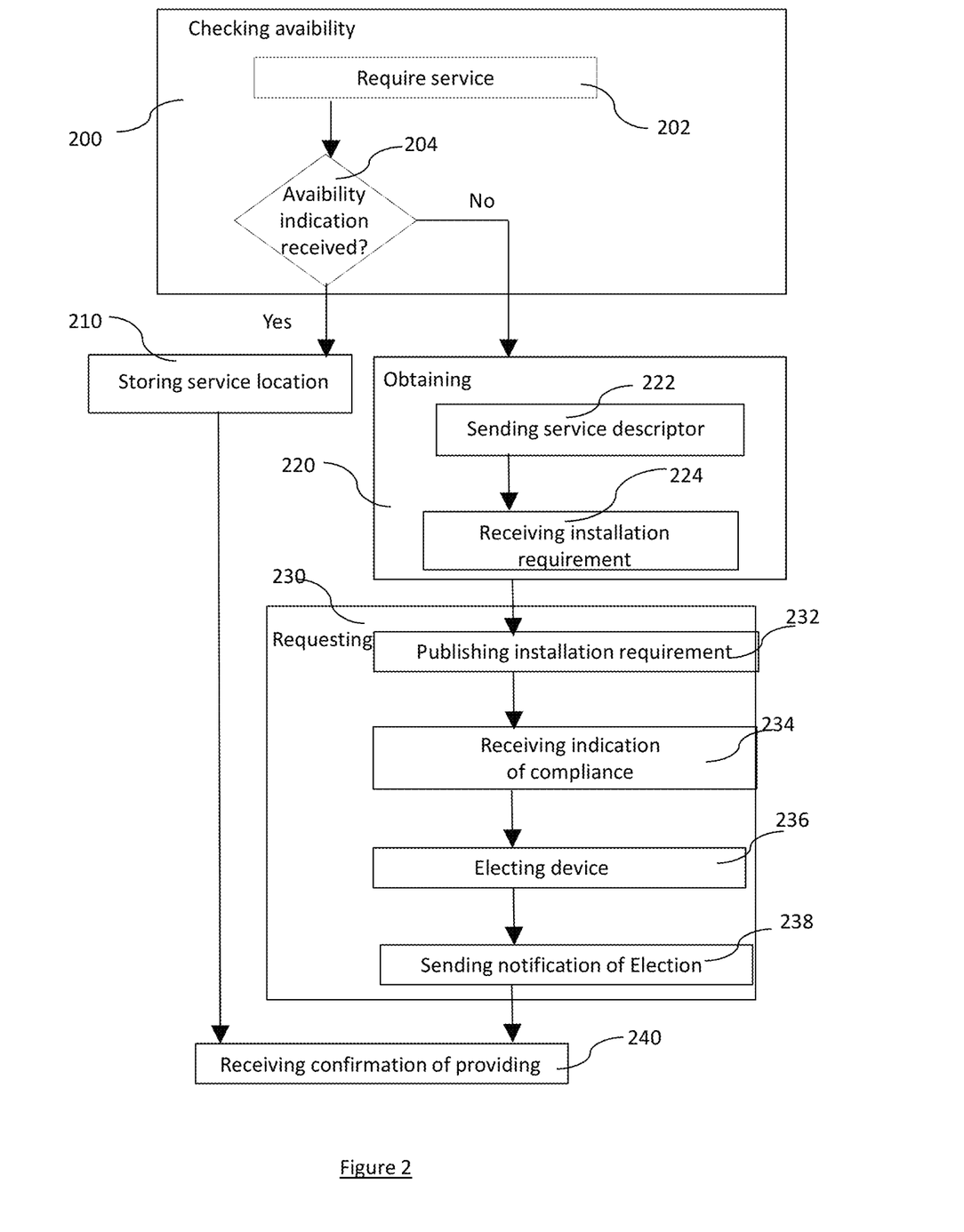
FIG. 2 is a functional diagram that illustrates a particular embodiment of the locating method of the present disclosure, compatible with the embodiment illustrated in FIG. 1.
Figure 4:
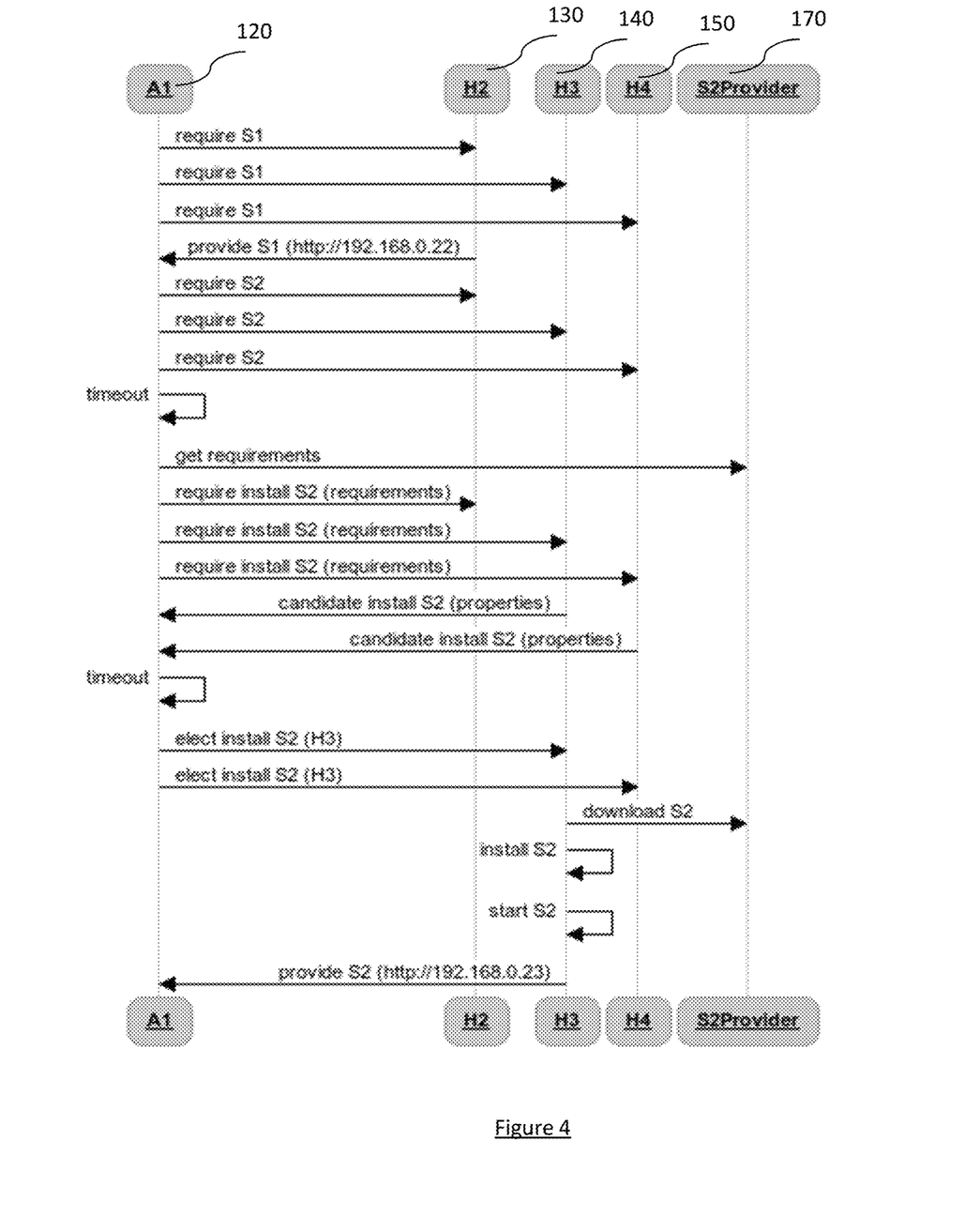
FIG. 4 illustrates data exchanges between some devices of the communication system illustrated in FIG. 1.
Figure 5:
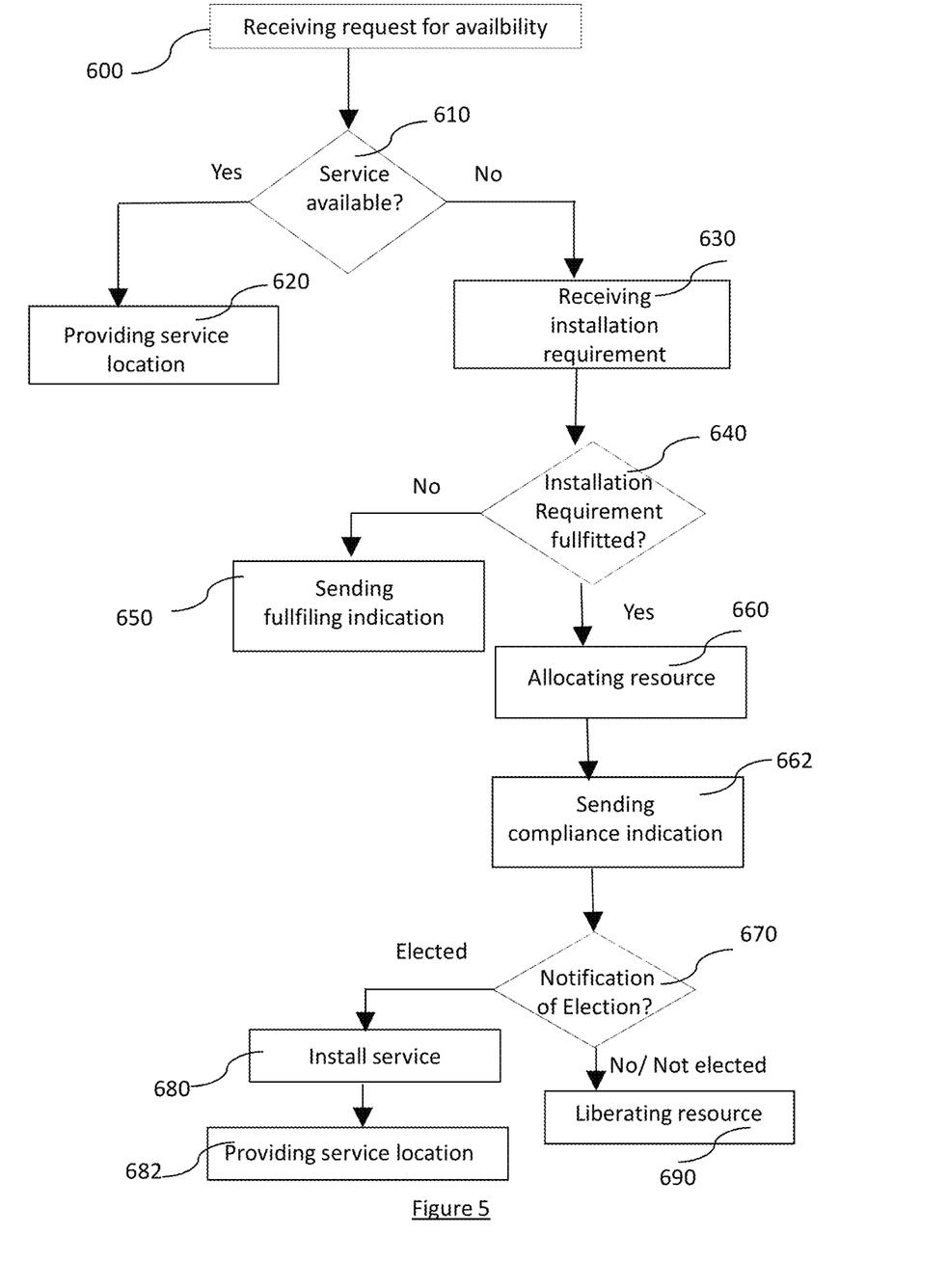
FIG. 5 is a functional diagram that illustrates a particular embodiment of the proposing method of the present disclosure, compatible with the embodiments illustrated in FIGS. 1, 2, and 4.

The exchanges between the communication devices of FIG. 1 are described more precisely in relation with FIGS. 2, 4 and 5.

As illustrated in FIG. 4, the application (A1) 126 located on the communication device 120 needs to use a first service S1 and a second service S2. For instance, those services can relate to a speech to text feature, a sound rendering feature, or a facial recognition feature. The first service 132 (S1) is located on a communication device 130 of the WLAN network 170 and the second service 172 (S2) is not available in the WLAN network 110. However, it is downloadable on a remote service provider 170. In the illustrated embodiment, the service provider belongs to a WAN network. In other embodiments, the service provider can also belong to the LAN network. For instance, the service provider can be a server of the LAN network that stores the codes of some services, for the purpose of their downloads on other devices of the LAN network.

FIG. 2 shows the locating method of the present disclosure, in a particular embodiment, implemented in a communication device 120 where the application (A1) 126 is located, after the launching of the application 126.

FIG. 5 shows the proposing method of the present disclosure, in a particular embodiment, implemented in a communication device 130, 140, 150 of the WLAN network 170.

It is to be underlined that, even if not illustrated, the locating and proposing method can be performed on the same communication device 120, 130, 140, 150. Notably, they can be performed concurrently on the same communication device. For instance, a device 130 can use the locating method for locating a service S2 needed by an application executed on the device and use the proposing method for proposing another service S1 needed by another application executed on another device.

According to the detailed embodiment illustrated by FIG. 2, the locating method is performed, during the initialization of the application 126, when a potential need for a service is detected, the service being not available locally, in the communication device 120. This service can be needed for a feature to be potentially performed by the application, during its execution. In other embodiments, the locating method can be performed during the execution of the application, at the moment the service is actually needed by the application. Such an embodiment can be better adapted for applications that are executing without any real time constraint, like an application running in batch mode. Such an embodiment can also avoid to spent computing time for locating a service that will actually not be used.

The locating method of the present disclosure comprises a checking 200 of an availability of the service on the LAN network. According to FIGS. 2 and 4, the checking comprises requiring 202 an indication of a service availability. This requiring can notably comprise a sending of at least one descriptor of the service.

In the illustrated embodiment, a service descriptor identifies at least one service in the WAN and LAN networks. Such a descriptor can notably be a string, like "com.technicolor.speech2text", identifying a name of a service. In such an embodiment, several versions of a service identified by the same name can exist on the WAN and/or LAN networks. The service can also be a string comprising the name and the version of the service.

According to FIG. 2, the method also comprises waiting for receiving 204 an availability indication. In this application, a negative indication of availability refers to a lack of availability of a service on a given device and a positive indication of availability refers to an availability of a service on a given device. A positive indication of availability can notably comprise a location, or address, of the service on the given device (for instance a Uniform Resource Identifier (URI) of the service like "http://192.168.0.22") as illustrated by FIG. 4). OF course, in othe embodiments, the positive and/or negative inditaion can have different meaning in term of availability.

The waiting can notably be performed until at least one response is received (when a watch dog is implemented at the application or device level for instance) or during a determined time. Depending on the embodiments, the waiting time may be determined dynamically during the checking, for instance calculated, or be a static value. Notably it can be assigned a value stored in a non-volatile memory of the communication device.

According to the illustrated embodiment of FIG. 4, a positive indication that the service S1 is available on another communication device 130 of the home network is received. This positive indication can be stored 210, at least partially, on the communication device 120. This positive indication can then be used to start the service, either during the initialization of the application, or at the time the service is actually needed. In some embodiments, only the first positive indication received is stored and the other positive indications that are received later are discarded. In other embodiments, several received positive indications of availability can be stored. In such embodiments, the method can comprise selecting, thanks to the stored indications, a location of the service. This selecting can be done during the initialization of the application, or at the time the service is actually needed. The selecting can be done automatically according to the stored indications. It can take into account the type of devices that can offer the service. Indeed, in some embodiments, a non-mobile device, nearly always operational, can be preferred to a mobile device (that can leave the LAN network) or to a device, often being powered off (like a Set Top Box). It can also take into account some known properties of the device, for instance a sensitivity of data stored by a device (like for avoiding a device storing sensitive data). In other embodiments, eventually complementary, the selection can also be done according to a choice made by a user of the communication equipment (for instance, a preferred rendering device can previously have been defined by a user, and/or a device containing sensitive data can have been indicated as not suitable for selection by a user).

When the waiting time has elapsed and/or no indication of availability has been received, or when only a negative indication of availability have been received, the method comprises obtaining 220 from a service provider at least one installation requirement related to the needed service.

The obtained installation requirements can notably comprise a requirement in terms of calculation or storage capacity (like a minimum calculation or storage capacity required) to be complied by a candidate device for storing and running locally the service. In some embodiments, it can also comprise operation system requirements, like a list of operating system (like Windows, MacOS, iOS, Linux, . . . ) supported by different versions of the service and proposed by the service provider.

In the illustrated embodiment, obtaining 220 (or in others words getting) comprises sending 222 a descriptor of the needed service to a service provider and receiving 224, in response, the installation requirements. In some embodiments, the address of the service provider can notably be a Uniform Resource identifier (URI) (like "http://api.technicolor.com/com.technicolor.speech2text"). Depending upon embodiments, the address of the service provider may be determined dynamically by the application, for instance during the obtaining 220, or may be a static value, known by the application. This static value can be a given string, written in the code of the application or stored in a non-volatile memory of the communication device.

In an embodiment where the obtaining 220 comprises a determining (not illustrated) of the service provider address, the determining can comprise requesting the address of the service provider to a remote server (for instance a server belonging to the application provider or a server offering a services directory). Depending upon embodiments, the service can be located in this remote server or on another server. In the illustrated embodiment, the communication device 120 receives 224, for instance, the following installation requirement:
host_requirements

```
{
    ram >= 2 GB
    cpu >= 2000 DMIPS
    reserved_storage = 102 MB
    os = android
    os_version >= 5.1
    type = apk
    arch = arm64
}
```

Where:
"ram" refers to an available writable volatile random-access memory;
"cpu" refers to a minimum processing capacity;
"reserved_storage" refers to a static storage size needed for an installation of the service;
"os" refers to a targeted operating system;
"os_version" refers to the oldest accepted version of the targeted Operating system;
"type" refers to a type of package of the service;
"arch" refers to an instruction set architecture (ISA) of a targeted microprocessor.

Once the installation requirements have been obtained, the method comprises requesting 230 an installation of the needed service on a device of the home network.

In the illustrated embodiment, the requesting 230 comprises publishing 232 the installation requirements on the home network. In some embodiments, it can be a broadcast of the installation requirements, inside the home network, to all the connected devices. In others embodiments, the installation requirements can be sent to a subset of the communication devices present in the home network (in order for instance to be received by only a particular type of devices, or by some determined devices). For instance, the installation requirement will not be sent to some devices that are known to store sensitive data.

The requesting 230 can also comprise receiving 234, from a candidate communication device 130, 140, 150 of the home network, an indication related to compliance, or lack of compliance, with the installation requirements sent.

A waiting (not illustrated) for receiving an indication can notably be performed until at least one indication is received (when a watch dog is implemented at the application or device level for instance) or during a determined time. Depending on the embodiments, the waiting time may be determined dynamically, for instance calculated, or be a static value. Notably it can be assigned a value stored in a non-volatile memory of the communication device. Depending upon embodiments, the waiting time for receiving an availability indication and the waiting time for receiving an indication of compliance can be identical or different.

Depending upon embodiments, the indication can comprise a two values indicator, like a boolean indicator, or can comprise some properties of the candidate device, like an identifier of the candidate device inside the home network, a list of met or failed requirements, or an actual capacity of the candidate communication device (like a free storage space) or a particular characteristic of a candidate communication device (like "mobile" or "settled"), not part of sent installation requirements. In such a case the compliance or lack of compliance will be deduced by the communication device 120 from the received indication, by a comparison with the installation requirements.

When at least one positive indication (indicative of a compliance, or at least of a possibility of compliance) has been received from a candidate device, the requesting can also comprise electing 236 one or several devices, in order to install and/or start the service, from the candidate devices from which a positive indication of compliance has been received. Depending upon embodiments, the electing 236 can take into account different criteria. For instance, a candidate communication device having an operating system similar to the one of the communication device, or the candidate communication device having the more storage space available can be preferred. The response latency, regarding the published requirements, can also be taken into account.

According to FIG. 2, after the electing 236, the requesting 230 comprises notifying 238 at least one candidate communication device of the result of the electing. In some embodiments, all the candidate communication devices can be notified of being either elected of not. In other embodiments, only the elected candidate communication devices, or only the non-elected candidate communication devices, can be notified.

In some embodiments, the method can also comprise receiving 240 of a confirmation of a providing of the service (for instance an installation and/or a starting of the service) by at least one elected device. This confirmation can comprise a location, or address, of the service on the home network (for instance a URI of the service like "http://192.168.0.23") as illustrated by FIG. 4).

The method can also comprise an invoking of the service S1, S2 on elected devices, when the service S1, S2 is actually needed by the application.

When no installation requirement has been obtained during the obtaining, or when no indication of compliance has been received during the requesting, or when no candidate communication device is compliant with the installation requirement, the behavior of the application can differ, depending on the feature that potentially needs to invoke the service.

For instance, the application can terminate immediately or when a feature that needs to use the service is used, or can execute in a degraded mode (with a warning message that some feature will be disabled). In some embodiments, the obtaining and/or requesting can be reiterated, at least several times. Notably, in an embodiment where the application will execute in a degraded mode in such situations, the obtaining and/or the requesting can be performed periodically or at the time of a recovery of the connexion to the home network, after a network failure, until the service becomes available on the home network. Such an embodiment can permit to benefit from a recovery after a network failure, or to benefit from a communication device newly connected to the LAN network.

FIG. 5 illustrates a particular embodiment of the method for proposing a service of the present disclosure. The method can be performed for instance in one of the communication devices 120, 130, 140, 150 of the home network illustrated on FIG. 1.

The method comprises receiving 600 a request for availability concerning a software service. This request can comprise a service descriptor, such as the service descriptor described in link with the locating method of the present disclosure.

The method can then comprise determining 610 if the service corresponding to the received service descriptor is available on the communication device. It can involve browsing system directories of the communication device according to the received descriptor. In some embodiments, the availability of the service can be managed by a determined module, in charge of sequencing the requests (coming from local applications or remote applications) for using the service.

Depending upon embodiments a service can be qualified as "available" if it is found and/or installed on the communication device and/or not reserved for another application.

When the service is available on the communication device, the method comprises sending an availability indication, comprising notably, as explained in link with the location method of the present disclosure, providing 620 a location of the available service to the sender of the received request.

In some embodiments, for instance where the service is offered by an application already running or when the service is offered at an Operating System level, the method can comprises starting the service. In other embodiments, the method can also comprise, installing an application that offers the service, if it is not yet installed, and/or starting such an application.

In some embodiments, when the service is not available on the communication device, the method comprises sending an indication of this unavailability (not illustrated). In other embodiments, no indication of unavailability is sent.

When the service is not available on the communication device, the proposing method can further comprise receiving 630 at least one installation requirement, (as described in link with the locating method of the present disclosure) representative of some capacities needed for the installation and/or execution of the service on a communication device. This receiving is optional. For instance, it may happen that in a situation where the service is available on another communication device of the home network, no requirement will be received.

The proposing method further comprises a checking 640 of the fulfilling of the installation requirement by the communication device.

When the installation requirement is fulfilled, the proposing method can comprise allocating 660 some resource to the service. This allocating 660 is optional. It can depend to the installation requirement. For instance, it can comprise reserving a given free space for a future installation and/or execution of the service. Depending upon embodiments, this allocating can be omitted or performed at a later stage (for instance after the sending (or notifying) 662 of an indication of compliance).

In the illustrated embodiment, the proposing method can also comprise notifying 650, 662 the sender of the installation requirement of the compliance, or the lack of compliance, of the communication device. A lack of compliance corresponds to at least one installation requirement not being fulfilled, like the operating system of the communication device not being the one required, or a lack of availability of a physical resource (CPU, RAM), or a required physical resource (like a loud speaker) not being present on the communication device (or in its peripheral resource). The notifying 650, 662 can be omitted. Notably, in some embodiments, no notifying is sent in case of a lack of compliance. In other embodiments, a notifying can be emitted even in case of a lack of embodiment. In still other embodiments, a notifying can be emitted only in case of a lack of compliance (the requirement being considered by default as fullfitted).

In the illustrated embodiment, the proposing method can also comprise receiving 670 a notification of election. The notification can comprise an indication that the communication device has been elected, or has not being electing for providing the service. This notification can constitute, or be followed by, a request for an installation of the service on the communication device when the communication device is an elected device. In some embodiments, the notifying comprises a file (or service executable code) to be downloaded, or a location of a file to be downloaded on the home network or on a second network (as described in link to the location method).

According to FIG. 5, when the communication device has been elected for providing the service, the method comprises installing 680 the service on the communication device. The installing can comprise downloading a file from a determined service provider. This server provider can be determined according to the request of installation received or previously known from the communication device.

In the illustrated embodiment, the method also comprises providing 682 a location of the installed service to the sender of the notifying of election. In some embodiments, the method can also comprise starting the installed service.

When a notification that the communication device has not being elected for providing the service is received, or when no notification is received (for instance during a determined time), the method can comprise liberating 690 the resource allocated to the service.

Figure 3:
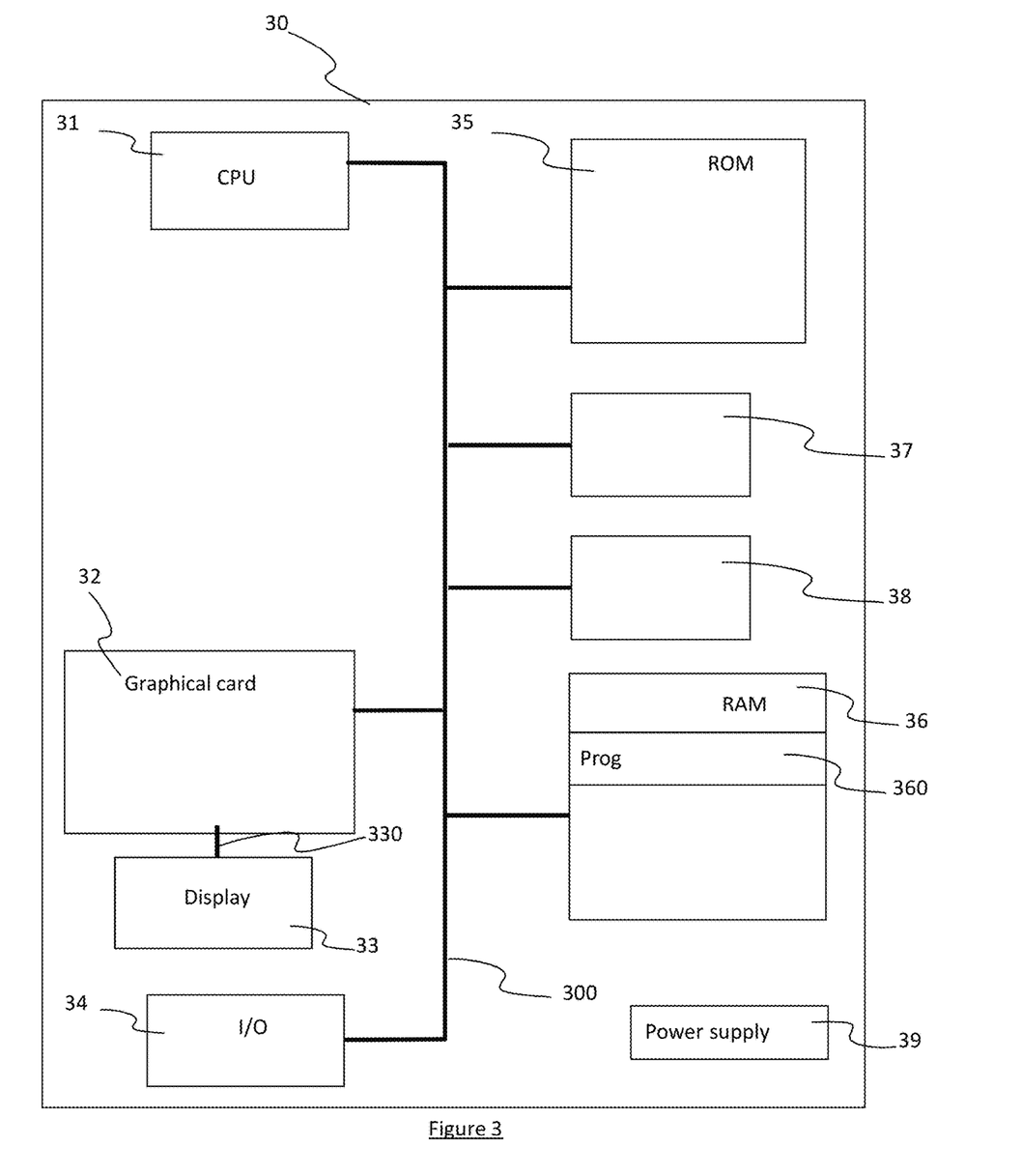
FIG. 3 illustrates a communication device adapted to execute at least one particular embodiment of the locating method and/or the proposing method of the present disclosure.

FIG. 3 describes the structure of a communication network device 30, such as the communication devices 120, 130, 140 or 150 as illustrated in FIG. 1. This device can be a wireless device, for instance a Wi-Fi device.

In the particular embodiment of FIG. 3, the communication network device 30 can comprise the following devices, linked together via a data and address bus 300, which can also carry a timer signal:

- a micro-processor 31 (or CPU);
- a graphics card 32 (depending on embodiments, such a card may be optional);
- at least one Input/Output module 34, (like a keyboard, a mouse, a led, and so on);
- a ROM (or <<Read Only Memory>>) 35;
- a RAM (or <<Random Access Memory>>) 36;
- communication interfaces 37, 38 configured for the reception and/or transmission of data, via a wireless connection (notably of type WIFI® or Bluetooth) or a wireless connection (notably of Ethernet type);
- a power supply 39.

In some embodiments, the communication network device 30 can also comprise, or be connected to, a display module 33, for instance a screen, directly connected to the graphics card 32 by a dedicated bus 330. In a variant, the display can be external to the communication network device 30. In some embodiments, the communication network device 30 can communicate with the display 33 thanks to a wireless interface. In other embodiments, the communication network device 30 can communicate with the display thanks to a wired interface, like a cable transmitting display signals. The communication network device 30 can comprise a connector (not illustrated) or a transmitting module adapted to transmit a display signal to an external display apparatus like an LCD or plasma screen or a video projector.

Each of the mentioned memories can comprise at least one register, that is to say a memory zone of low capacity (a few binary data) or high capacity (with a capability of storage of a whole program or of all or part of data representative of data to be calculated or displayed).

When the communication network device 30 is powered on, the microprocessor 31 loads the program instructions 360 in a register of the RAM 36, notably the processes needed for performing at least one embodiment of the locating and/or proposing methods described herein, and executes the program instructions.

According to a variant, the communication network device 30 comprises several microprocessors. According to another variant, the power supply 39 is external to the communication network device 30.

In the particular embodiment illustrated in FIG. 3, the communication network device belongs to at least one network of communication devices.

In some embodiments, the microprocessor 31 can be configured for:

checking an availability of a service on said network;

when the service is not available on said network, obtaining at least one installation requirement representative of at least one capacity required from a candidate device for an installation of the service on said candidate device;

publishing (or sending) the obtained installation requirement on said network;

receiving an indication of a compliance, of at least one candidate device of said network, to said installation requirement;

sending an order of installation of the service to at least one of said candidate devices according to said indication of compliance.

In some other embodiments, eventually complementary, the microprocessor 31 can be configured for:

receiving a request for an availability of a service;

when said service is available on said communication device, sending an indication of said availability to the sender of said request;

when said service is not available on said communication device, receiving at least one installing requirement representative of at least one capacity required from a candidate device for the installation of said service on said candidate device;

when said communication device hold said at least one required capacity, transmitting an indication of compliance of said communication device to a sender of said received installation requirement.

The communication network device 30 can belong to a system further comprising other communications devices, similar to the communication network device, in one of its embodiments.

The present disclosure has been described in relation with a WIFI distribution system.

Of course, as it will be understandable for a person skilled in the art, the present disclosure may also been applied in wireless distribution system using other network protocols, notably wireless network protocols like WIFI, WiMAX, or Bluetooth protocols.

The invention claimed is:

1. A method to be performed in a first communication device belonging to at least one first network of communication devices, said method comprising:

checking an availability of a service on said first network, and when the service is not available on said first network, obtaining at least one installation requirement representative of at least one capability required from a candidate device for an installation of the service on said candidate device;

sending the obtained installation requirement on said first network;

receiving at least one indication of a compliance, of at least one second communication device of said first network, to said installation requirement;

sending an order of installation of the service to at least one of said at least one second communication device, selected according to said received indication of compliance; and invoking said service on at least one of said selected second communication device.

2. The method of claim 1 wherein said method comprises, when the service is available on another communication device of said first network, invoking the service on said another communication device.

3. The method of claim 1 wherein said checking comprises:

sending at least one descriptor of the service; and waiting for an indication of an availability of the service on said first network.

4. The method of claim 1 wherein said obtaining comprises:

sending a descriptor of said non-available service to a provider of said service; and receiving said installation requirement.

5. The method according to claim 4 wherein said service provider and said first communication device belong to a second communication network.

6. The method of claim 1 wherein said service is to be invoked by a software application executing on said first communication device.

7. A first communication device adapted to be connected to at least one first network of communication devices, said first communication device comprising at least one processor configured for:

checking an availability of a service on said first network, and when the service is not available on said first network, obtaining at least one installation requirement representative of at least one capability required from a candidate device for an installation of the service on said candidate device;

sending the obtained installation requirement on said first network;

receiving at least one indication of a compliance of at least one second communication device of said first network, to said installation requirement;

sending an order of installation of the service to at least one of said second communication device, selected according to said at least one indication of compliance; and invoking said service on at least one of aid selected second communication device.

8. The first communication device of claim 7 wherein said processor is configured for invoking the service on another device of said first network when the service is available on said another device.

9. The first communication device of claim 7 wherein said obtaining comprises:

sending a descriptor of said non-available service to a provider of said service;

receiving said installation requirement.

10. The first communication device of claim 9 wherein said service provider and said first communication device belong to a second communication network.

11. The first communication device of claim 7 wherein said first network is a local area network and/or a home network.

12. The first communication device of claim 7 wherein said service is to be invoked by a software application executing on said first communication device.

13. A method to be performed in a first communication device belonging to at least one first network of communication devices, said method comprising:
   receiving a request for an availability of a service inside said first network;
   when said service is available on said first communication device, sending an indication of said availability to the sender of said request;
   when said service is not available on said first communication device, receiving at least one installing requirement representative of at least one capability required from a candidate device for the installation of said service on said candidate device;
   when said first communication device hold said at least one required capability, transmitting an indication of compliance of said first communication device to a sender of said received installation requirement.

14. The method of claim 13 wherein said method comprises allocating said required capability to said service.

15. The method of claim 13 wherein said method comprises, when receiving a request of installation of said service, installing said service on said first communication device.

16. The method of claim 13 wherein said installing comprises downloading said service from a second network.

17. The method of claim 13 wherein said method comprises, when receiving a cancellation message, liberating said allocated capability.

18. A first communication device adapted to be connected to at least one first network of communication devices, said first communication device comprising at least one processor configured for:
   receiving a request for an availability of a service;
   when said service is available on said first communication device, sending an indication of said availability to the sender of said request;
   when said service is not available on said first communication device, receiving at least one installing requirement representative of at least one capability required from a candidate device for the installation of said service on said candidate device;
   when said first communication device hold said at least one required capability, transmitting an indication of compliance of said first communication device to a sender of said received installation requirement.

19. The first communication device of claim 18 wherein said processor is configured for installing said service on said first communication device, when receiving a request of installation of said service.

20. The first communication device of claim 19 wherein said installing comprises downloading said service from a second network.

* * * * *